(12) United States Patent
Harberts et al.

(10) Patent No.: US 8,413,944 B2
(45) Date of Patent: Apr. 9, 2013

(54) MOUNTING SYSTEMS FOR SOLAR PANELS

(75) Inventors: John Henry Harberts, Clinton Township, MI (US); Aaron Faust, Clinton Township, MI (US); John Edward Klinkman, Clinton Township, MI (US); Ronald Paul Katt, Clinton Township, MI (US); David Wayne Raffler, Clinton Township, MI (US)

(73) Assignee: Applied Energy Technologies, Saline, MI (US)

( * ) Notice: Subject to any disclaimer, the term of this patent is extended or adjusted under 35 U.S.C. 154(b) by 438 days.

(21) Appl. No.: 12/771,079

(22) Filed: Apr. 30, 2010

(65) Prior Publication Data

US 2010/0276558 A1 Nov. 4, 2010

Related U.S. Application Data

(60) Provisional application No. 61/174,505, filed on May 1, 2009.

(51) Int. Cl.
*A47B 97/00* (2006.01)

(52) U.S. Cl.
USPC .............. 248/500; 52/173.3; 52/464; 52/665; 248/505; 248/510

(58) Field of Classification Search .................. 248/500, 248/505, 510; 52/173.3, 464, 665
See application file for complete search history.

(56) References Cited

U.S. PATENT DOCUMENTS

| | | | |
|---|---|---|---|
| 1,656,044 A * | 1/1928 | Cibulas | 52/95 |
| 1,893,481 A * | 1/1933 | Adams | 52/489.1 |
| 2,707,013 A * | 4/1955 | Flora et al. | 411/173 |
| 3,298,271 A * | 1/1967 | Krueger | 411/432 |
| 3,830,029 A * | 8/1974 | Vance | 52/395 |
| 3,844,087 A * | 10/1974 | Schultz et al. | 52/200 |
| 4,133,159 A | 1/1979 | Nelson | |
| 4,595,325 A * | 6/1986 | Moran et al. | 411/173 |
| 5,274,978 A | 1/1994 | Perkonigg et al. | |
| 5,762,720 A | 6/1998 | Hanoka et al. | |
| 6,193,455 B1 * | 2/2001 | Levey | 411/179 |
| 6,360,419 B1 | 3/2002 | Newcomer | |
| 6,414,237 B1 | 7/2002 | Boer | |
| 6,584,737 B1 | 7/2003 | Bradley, Jr. | |
| 6,672,018 B2 | 1/2004 | Shingleton | |
| 6,786,012 B2 | 9/2004 | Bradley, Jr. | |

(Continued)

FOREIGN PATENT DOCUMENTS

DE 202008007705 U1 10/2008

*Primary Examiner* — Amy J Sterling
(74) *Attorney, Agent, or Firm* — Young Basile

(57) ABSTRACT

Mounting systems for mounting solar panels to a surface are disclosed and can include panel clamp assemblies and rail clamp assemblies. Panel clamp assemblies can comprise a panel clamp having a base and arms extending from edges of the base, the base having an aperture, a rail clamp having a central portion with an aperture and two flexible tabs extending from the central portion on opposing sides of the aperture and a fastener threaded through the apertures such that that flexible tabs contact a head of the fastener and the arms extend in an opposite direction from the flexible tabs. Rail clamp assemblies can comprise a base member having a bottom and two side walls, the bottom having at least one aperture and each side wall having an elongated aperture, two clamping members and a fastener, wherein the side walls of the base member are positioned such that the opening is of sufficient size to receive the rail.

9 Claims, 21 Drawing Sheets

U.S. PATENT DOCUMENTS

| | | |
|---|---|---|
| 7,012,188 B2 | 3/2006 | Erling |
| 7,260,918 B2 | 8/2007 | Liebendorfer |
| 7,600,349 B2 | 10/2009 | Liebendorfer |
| 2003/0101662 A1 | 6/2003 | Ullman |
| 2003/0177706 A1 | 9/2003 | Ullman |
| 2006/0118163 A1 | 6/2006 | Plaisted et al. |
| 2007/0251567 A1 | 11/2007 | Plaisted |
| 2008/0010915 A1 | 1/2008 | Liebendorfer |
| 2008/0155908 A1 | 7/2008 | Nomura et al. |
| 2008/0250614 A1 | 10/2008 | Zante |
| 2009/0282755 A1 | 11/2009 | Abbott et al. |
| 2010/0192505 A1* | 8/2010 | Schaefer et al. ............. 52/653.2 |

* cited by examiner

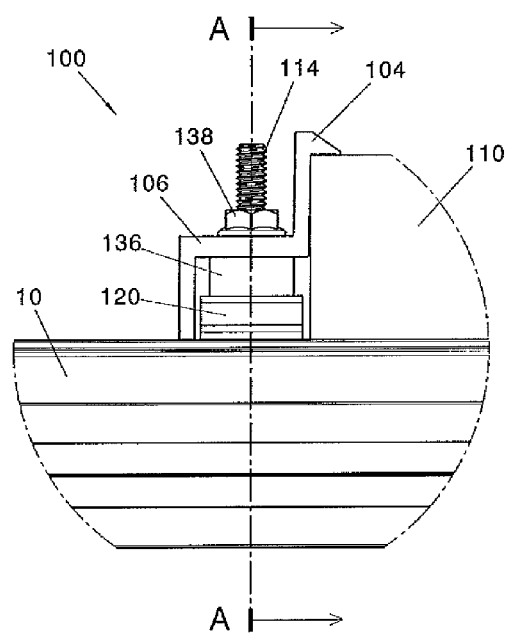
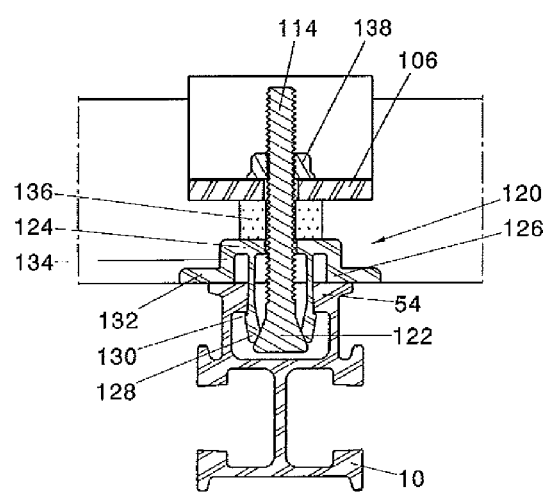
FIG. 12
FIG. 13A

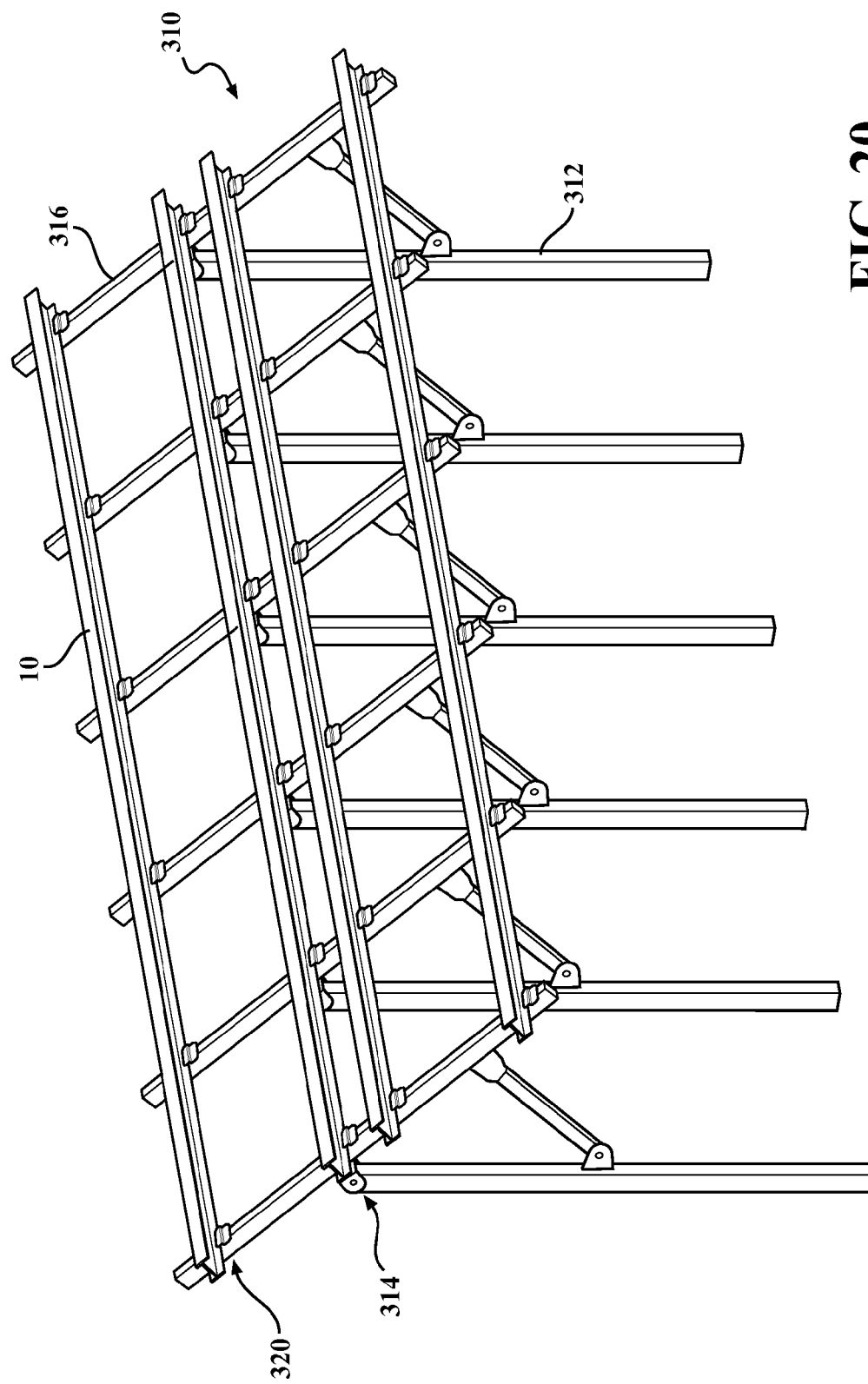

MOUNTING SYSTEMS FOR SOLAR PANELS

CROSS-REFERENCE TO RELATED APPLICATION

This application claims priority to U.S. Provisional Patent Application No. 61/174,505, filed May 1, 2009, the entire contents of which is incorporated herein by reference.

FIELD OF THE INVENTION

The present invention relates in general to ground and roof mounting systems for solar panels and in particular, unique attachment means for attaching solar panels to the racking systems.

BACKGROUND

Solar panels are becoming an increasingly useful means of providing renewable energy for commercial and residential properties. Mounting solar panels correctly can contribute to maximizing energy production. The mounting of the solar panels also contributes to protecting the solar panels from the force of wind. The proper solar panel mounting provides stability and determines the directional and latitudinal orientation of the solar array. Solar panels can be mounted on the roof, the ground, or on a pole, for example. The different mounting systems pose different challenges that need to be addressed. One objective in the design of mounting systems is easing the difficulty of installation, thereby minimizing cost while maximizing efficiency.

BRIEF SUMMARY

Disclosed herein are mounting systems for mounting at least one solar panel to a surface. Embodiments of the mounting system can comprise a rail clamp assembly configured to clamp a panel rail to the surface and a panel clamp assembly configured to clamp a solar panel to the panel rail. The rail clamp assembly can comprise a base member having a bottom and two side walls extending from opposing edges of the bottom, the side walls forming an opening between them, the bottom having at least one aperture therein and each side wall having an elongated aperture therein. Two clamping members can be positioned opposite each other along an exterior surface of each side wall, each clamping member having at least one clamp portion extending from the clamping member substantially perpendicular to the side wall into the opening, each clamping member having an aperture therein. A fastener can extend through the clamping member apertures and the side wall elongated apertures, wherein the bottom of the base member is attachable to the surface, the rail is positionable in the opening, and the clamp portions are configured to contact the panel rail on opposing sides. The panel clamp assembly can comprise a panel clamp having a base and at least one arm extending from an edge of the base, the arm having a clamping end opposite the base, the base having an aperture therein. A rail clamp can have a central portion with an aperture therein and two flexible tabs extending from the central portion on opposing sides of the aperture. A fastener can extend through the apertures in the central portion and the base such that that flexible tabs contact a head of the fastener and the at least one arm of the panel clamp extends in an opposite direction of the flexible tabs, wherein the head of the fastener and the flexible tabs are positionable within a channel of the panel rail and the clamping end is configured to secure an edge of the solar panel.

Also disclosed herein are embodiments of ground and roof mounting systems for at least one solar panel with various embodiments of panel and rail connectors. One embodiment of a mounting system for at least one solar panel comprises one or more of a connecting system to connect two beams without the need of a drill comprising a first slot configured to receive a lower beam and a second slot substantially perpendicular to the first slot and configured to receive an upper beam; a connecting system to connect two tubes without the need of a drill comprising a horizontal tube, a vertical tube integral with the horizontal tube, wings extending from at least the vertical tube on opposite sides of the vertical tube and at least one aperture through one or both wings; a panel rail connector comprising a U bracket and two Z brackets parallel to each other and spanning the U bracket and configured to receive a portion of the panel rail between the Z brackets; a panel clamp assembly comprising a panel clamp configured to receive a frame of the solar panel, a base member adjacent to or integral with a bottom of the clamp, the base member having a rail clamp extending from each side and perpendicular to the panel clamp and a fastener extending through the panel clamp and base member; and a quick connect panel clamp comprising a fastener, at least one panel clamp and at least one rail clamp.

BRIEF DESCRIPTION OF THE DRAWINGS

The description herein makes reference to the accompanying drawings wherein like reference numerals refer to like parts throughout the several views, and wherein:

FIG. 12 is a side view of FIG. 11;

FIG. 13A is a cross sectional view of FIG. 12 taken along line A;

FIG. 20 is perspective views of a ground mounted solar panel racking system;

DETAILED DESCRIPTION OF EMBODIMENTS

Figure 1:
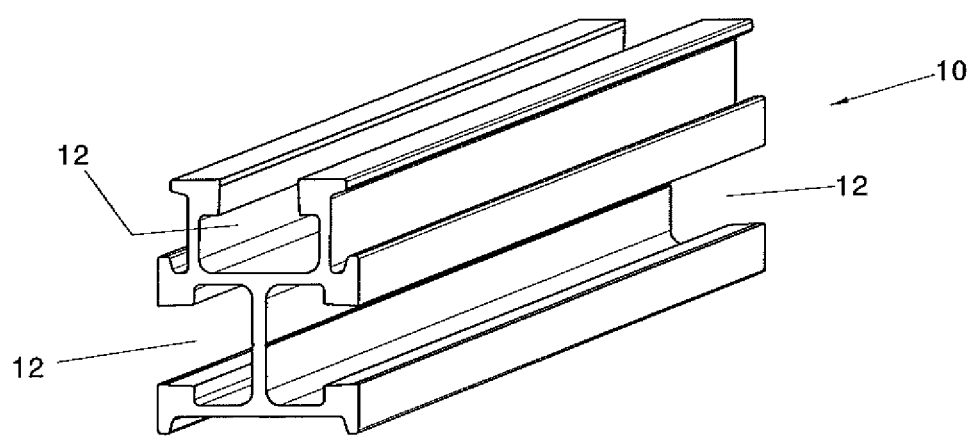
FIG. 1 is a perspective view of an embodiment of a support rail used in solar panel mounting systems.

FIG. 1 illustrates a rail 10 that can be used with the mounting systems disclosed herein. The rail 10 is exemplary and other rail configurations can be used with any of the mounting systems herein. The rail 10 has three channels 12 of equal dimensions. The symmetrical channels on three sides of the rail 10 make the rail versatile, allowing for many different attachments extending from the rail 10 in three different directions. With the symmetrical channels 12, the rail 10 can be positioned as desired to attachment in the three directions of choice. The rails can be made of aluminum to resist corrosion and lengthen the operational life of the system. However, other appropriate materials can be used as desired or required by those skilled in the art. Another non-limiting example of rails that can be used with the systems disclosed herein include I beam rails.

Figure 2:
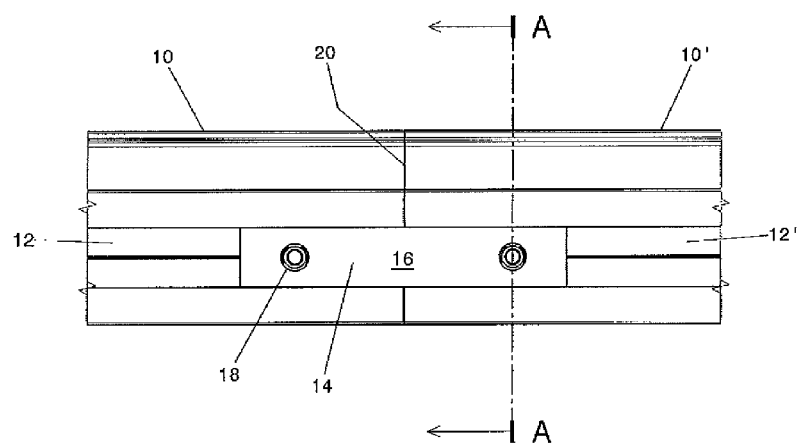
FIG. 2 is a side view of two rails shown in FIG. 1 joined by splice kit as disclosed herein.
Figure 3:
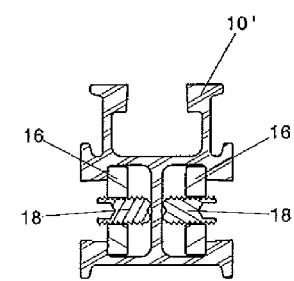
FIG. 3 is a cross sectional view of FIG. 2 along line A.

FIG. 2 is a side view of the rail 10 shown in FIG. 1. Rails 10, 10' are shown joined with a splice kit 14. FIG. 3 is a cross sectional view at line A of the rail 10 and splice kit 14. The splice kit 14 comprises two plates 16 with two screws 18 in each plate 16. The plates 18 are positioned in opposing channels 12 directly opposite each other and spanning a seam 20 of the rails 10, 10' where the rails 10, 10' are joined. Only one plate 16 with its screws 18 is seen in FIG. 2. FIG. 3 shows both plates 16 directly opposite each other with one set of screws 18 tightened against the rail 10 at the bottom of the channel 12 and the other set of screws tightened against the rail 10' at the bottom of its channel 12'. The plates 16 have a width larger than the opening of the channel 12 so that when the set screws 18 are tightened against the bottom of the channel 12, a surface of the plate 16 is forced against the channel opening to hold the plate 16 stationary in the channel 12 as shown. The plates 16 and screws can be made stainless steel. The splice kit 14 disclosed herein does not require the use of a drill, requiring less tools for installation. The splice kit 14 used to join the rails 10, 10' as shown can electrically ground rails 10 and 10' together thus eliminating the need for grounding the rails independently of one and other.

Figure 4:
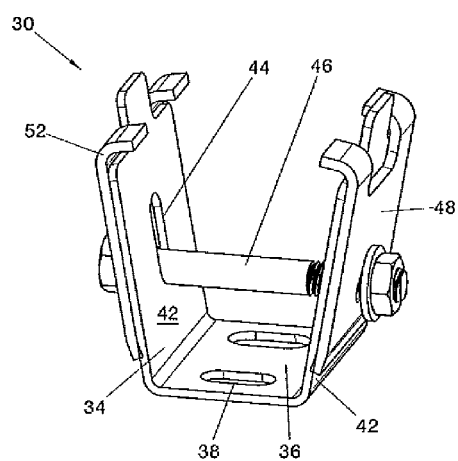
FIG. 4 is a perspective view of an embodiment of a rail clamp assembly.
Figure 5:
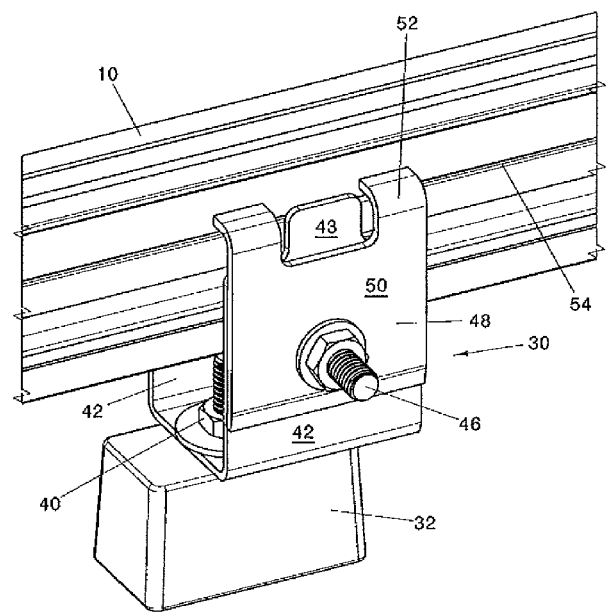
FIG. 5 is a perspective view of the embodiment of FIG. 4 shown mounted on a bracket and clamping the rail of FIG. 1.

FIGS. 4-9 illustrate an embodiment of a rail clamp assembly that can be used in a mounting system. The rail clamp assembly 30 is versatile in that it can be used with a U bracket to connect the panel rail 10 to tubes typically used in ground mounting systems, and can be directly attached to any flat surface such as a roof. The rail clamp assembly 30 attaches a rail 10 of the solar panel mounting system to a roof typically via a mounting bracket 32 as shown in FIG. 5. This mounting bracket 32 is shown as an example and is not meant to be limiting. The rail clamp assembly 30 comprises a base member 34 in the approximate shape of a channel or a U with a flat bottom 36. The bottom 36 has at least one aperture 38 through which fasteners 40 such as bolts can be threaded as needed to attach the rail clamp assembly 30 to, for example, the mounting bracket 32. The aperture 38 can be any shape and size to accommodate one or more sized fasteners. For example, the aperture 38 can be a slot sized to accommodate both ⅜ inch bolts and 5/16 inch bolts. This provides versatility, allowing the rail clamp assembly 30 to be used with different mounting bracket configurations and manufacturers.

The base member 34 includes a rail portion having side walls 42 extending from opposing edges of the bottom 36. Each side wall 42 has a center tab 43 extending from a central portion of the edge of the side wall 42 opposite the bottom 36. The base member 34 can be formed from a single piece of material or the rail portion can be connected to the bottom 36 by means which allow some flexibility of the side walls 42. Each side wall 42 of the base member 34 has an elongated aperture or slot 44 elongated perpendicular to the bottom 36. The slots 44 are directly opposite each other. Another fastener 46 passes through the slot 44 in each side wall, spanning the opening between side walls 42. Positioned on each side wall 42 on its exterior surface is clamping member shaped similar to an L bracket 48 having a main portion 50 and clamp portions 52. Each main portion 50 has an aperture through which the fastener 46 extends. The clamp portions 52 can be legs extending inward toward the opening on each side of the center tab 43 of the side walls 42 to grasp an edge of the rail 10.

Figure 6:
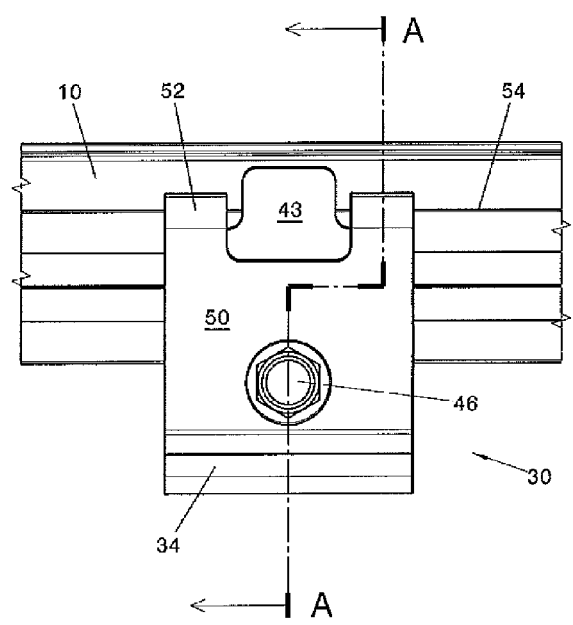
FIG. 6 is a side view of FIG. 5.
Figure 7:
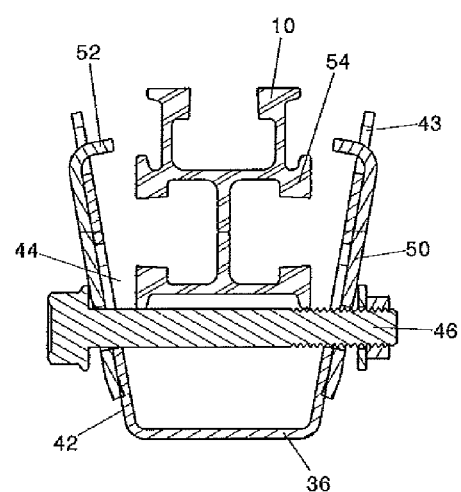
FIG. 7 is a cross sectional view of FIG. 6 along line A.
Figure 9:
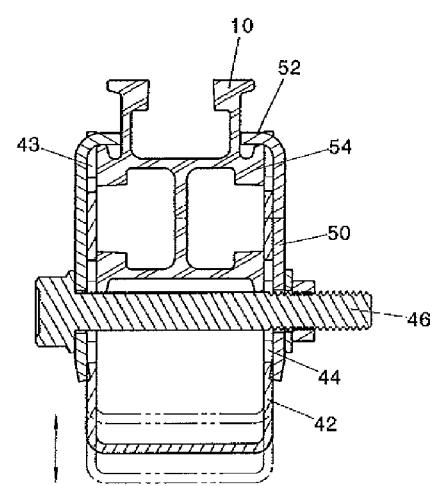
FIG. 9 is a cross sectional view of FIG. 8 along line A.

The rail clamp assembly 30 is manufactured as shown in FIGS. 4 and 7 in the open position so that after mounting to a roof or ground mount, a rail 10 can be dropped into the rail clamp assembly 30 without the need for loosening the fastener 46 and opening the jaws. FIG. 7 is a cross sectional view of the rail clamp assembly 30 along line A-A of FIG. 6 shown in the open position with a rail 10 positioned within the clamp. When the rail 10 is properly positioned, the fastener 46 is tightened. Tightening the fastener 46 moves both the side walls 42 of the base member 34 and the associated L bracket 48 together to reduce the size of the opening. As the fastener 46 is tightened, the leg portions 52 of each L bracket 48 close in over channel walls 54 as seen in FIG. 9. The rail clamp assembly 30 can be sized so that when the rail 10 is positioned in the opening, the rail 10 rests on the fastener 46 and the leg portions 52 of the L bracket 48 friction fit over the channel walls 54 to clamp the rail 10 to the roof or ground mount.

Figure 8:
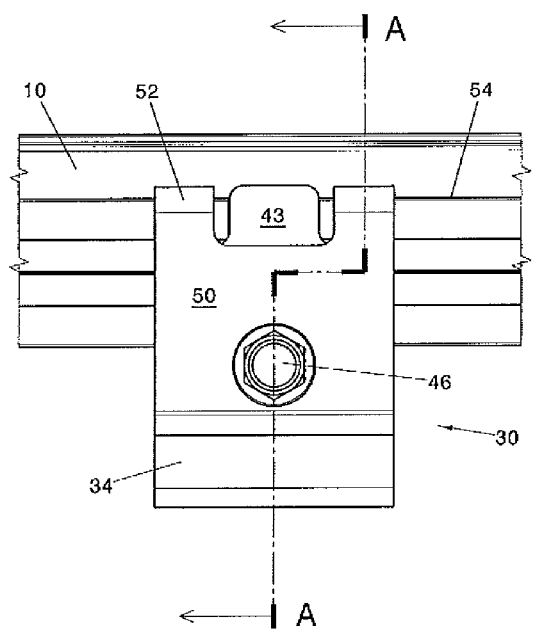
FIG. 8 is the side view of FIG. 6 with the rail clamp assembly in a closed position.

The slots 44 in the base member 34 allow for movement of the base member up and down as shown by the arrow in FIG. 9. The rail 10, L bracket 48 and fastener 46 do not move relative to each other. The ability to move the rail 10, clamping member 48 and fastener 46 relative to the base member 34 by moving the fastener 46 within the slot 44 provides the ability to keep the rails 10 level across a surface that is not level. Accordingly, waves in roofs, for example, can be accommodated while keeping the solar panels mounted to the rails in the orientation desired. The center tabs 43 extending from the side walls 42 allows for the base member 34 to be in its most extended position while still providing a surface against which the channel wall 54 is tightened, as shown in FIGS. 8 and 9. Because pre-fabricated holes are not required to attach the rails to the mounting systems, the rail clamp assembly 30 allows for efficient installation of panel mounting rails without the need for a drill. The versatility of rail configurations is significantly increased because the rail clamp assembly 30 can be located anywhere along the rail 10. The rail clamp assembly can be made out of stainless steel to prevent corrosion of the assembly. However, it is contemplated that the rail clamp assembly can be made out of steel, aluminum and other metals as known to those skilled in the art.

Figure 10:
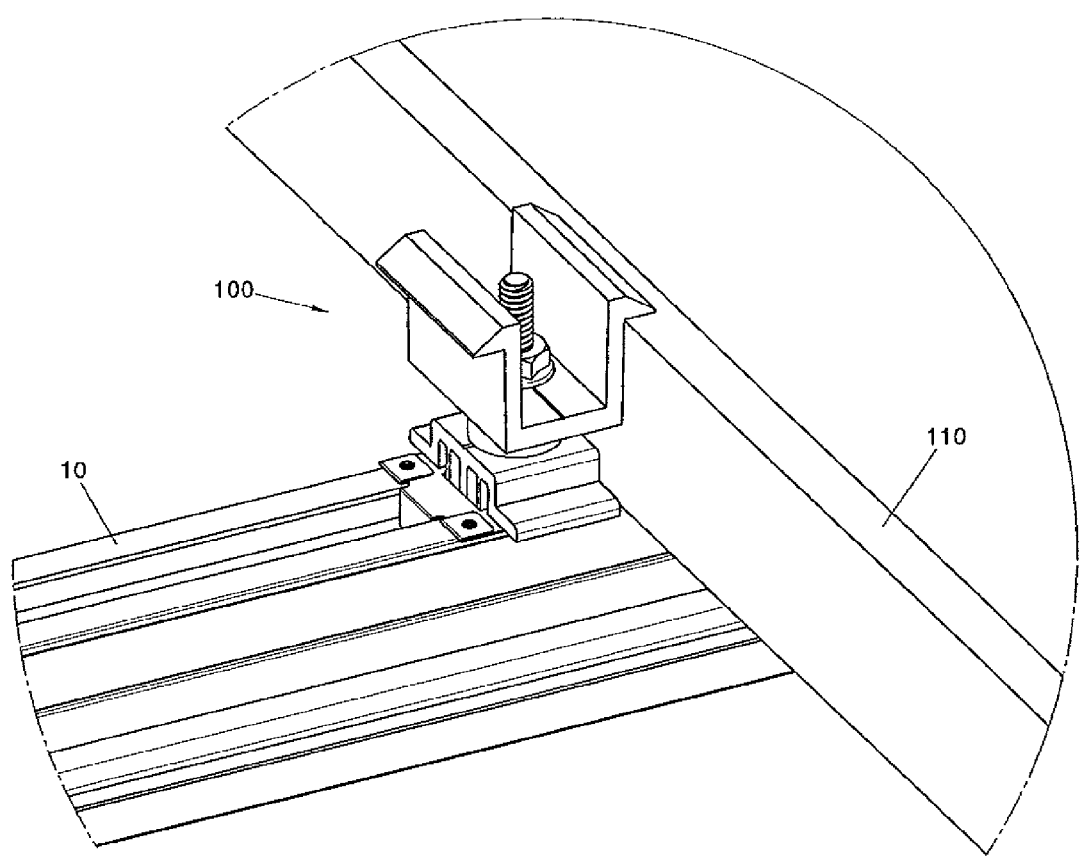
FIG. 10 is a perspective view of an embodiment of a panel clamp assembly as disclosed herein.
Figure 11:
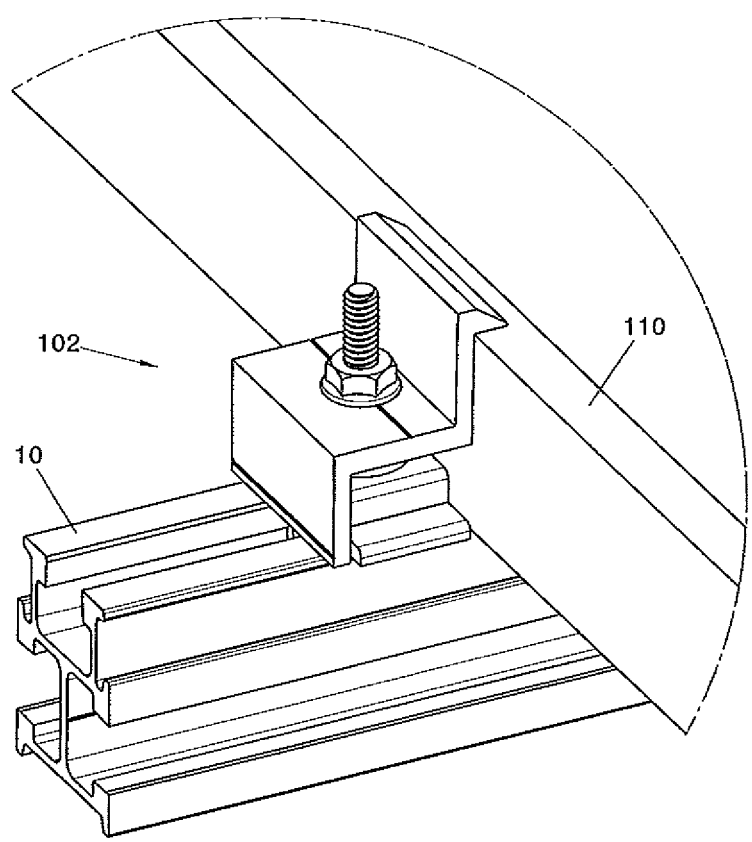
FIG. 11 is a perspective view of another embodiment of a panel clamp assembly.

Also disclosed herein are embodiments of panel clamp assemblies. FIG. 10 is a perspective view of a panel mid-clamp assembly 100 attached to a rail 10 and clamping a solar panel 110. FIG. 11 is a perspective view of a panel end-clamp assembly 102 attached to a rail 10 and clamping a solar panel 110. The mid-clamp assembly 100 and end-clamp assembly 102 are similar in most respects except that the end-clamp assembly 102 only has a single arm 104 for clamping the edge of one solar panel while the mid-clamp assembly 100 has two symmetrical arms 104 each configured to clamp an edge of adjacent solar panels. Accordingly, both will be referred to as panel clamp assembly 100.

FIG. 12 is a side view of FIG. 11, the panel end-clamp assembly 102 attached to a rail 10 and clamping a solar panel 110. FIG. 13A is a cross section view of FIG. 12 along line A. The panel clamp assembly 100 has a panel clamp 103 comprising a base 106 having opposing edges from which the one or two clamping arms 104 extend substantially perpendicular to the base 106. The one or two clamping arms 104 have a clamping end 108 extending from the clamping arm 104 opposite the base 106 and configured to contact the frame of the solar panel 110. The base 106 has an aperture 112 through which a fastener 114 extends.

The panel clamp assembly 100 also has a rail clamp 120 that cooperates with the head 122 of the fastener 114 to attach the assembly 100 to the rail 10. The rail clamp 120 has a base 124 having an aperture 126 through which the fastener 114 extends. From each of two opposing edges of the base 124 extend a step portion 126. Two flexible tabs 128 also extend from the base 124 between the aperture 126 and step portions 126. Each flexible tab 128 has a ledge 130 extending in the direction opposite the fastener 114. The foot 132 of the step portion 126 cooperates with the ledge 130 of the associated flexible tab 128 to clamp on either side of the channel wall 54 of the rail 10. The step 134 of the step portion 126 is configured with a width to increase the overall length of the flexible tabs 128 to provide the desired flexibility. However, it is contemplated that the step portion 126 can be eliminated as desired or required by those skilled in the art. The rail clamp 120 can be made from aluminum to achieve the proper tolerances between the parts. However, the rail clamp portion can also be made from stamped steel, stainless steel and the like.

The panel clamp assembly 100 is assembled with the fastener 114 inserted through the aperture 126 of the rail clamp 120 with the flexible tabs 128 extending toward the head 122 of the fastener 114. Between the rail clamp portion 126 and the panel clamp 103 is inserted an optional deformable portion 136. The deformable portion 136 can have an aperture through which the fastener 114 is inserted or can have a seam and be snapped onto the fastener 114 from the side. The deformable portion 136 can also be one or more individual portions placed between the rail clamp portion 126 and the panel clamp 103. The deformable portion 136 can be made from foam, rubber, nylon and the like or it can be a spring made out of metal or a plastic, for example. The deformable portion 136 is sized and configured to support the clamping arms 104 in a position ready to accept the edge of a solar panel 110. This makes installation easier and more efficient. The panel clamp 103 is threaded onto the fastener and is secured with a nut 138.

Figure 13B:
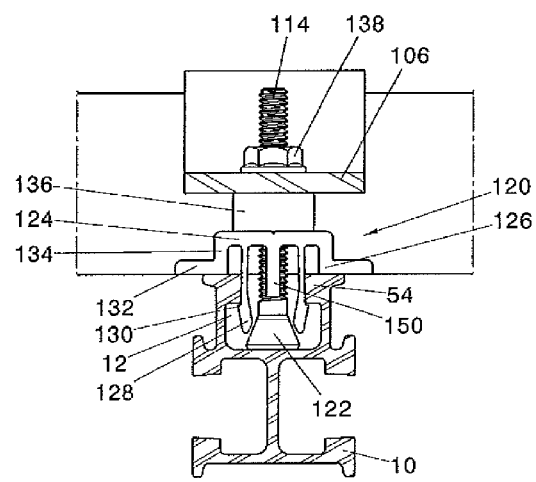
FIGS. 13B and 13C are side views of the panel clamp at different stages during installation.
Figure 13C:
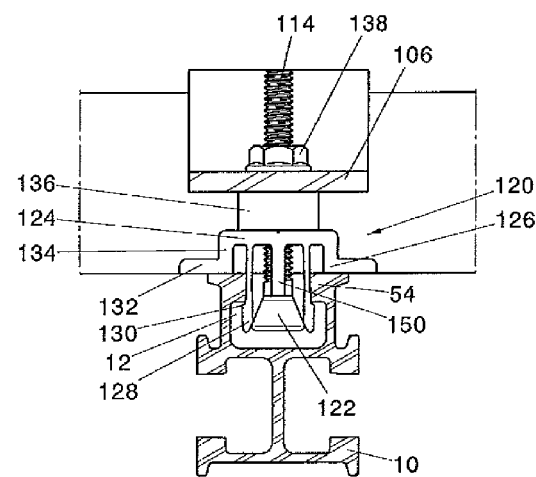

FIGS. 12 and 13A-C show the panel clamping assembly 100 in use. With the fastener 114 loosened so that the flexible tabs 128 can flex toward the fastener 114, the head 122 of the fastener 114 is inserted into the channel of the rail 10 followed by both flexible tabs 128 until the channel wall 54 contacts the foot 132 of the step portion 126. This is shown in FIG. 13B. The flexible tabs 128 flex toward the fastener 114 as they are inserted through the channel 12. The flexible tabs 128 and step portion 126 are configured so that when the foot 132 contacts the rail 10, the ledge 130 of the flexible tabs 128 has passed the channel wall 54, at which point the flexible tabs 128 bias away from the fastener 114, gripping the channel wall 54 between the ledge 130 and the foot 132. The edge of the solar panel 110 is slid into position under the clamping arm 104 as shown in FIG. 12. At this point, the nut 138 is tightened, pulling the fastener 114 up until it presses against the flexible tabs 128, thereby urging the flexible tabs 128 toward the channel wall 54 as seen in FIG. 13C, locking the tabs 128 in place. As shown, the head 122 of the fastener 114 is a wedge-shaped head configured with inclined edges that further urge the flexible tabs 128 toward the channel wall 54 as the fastener 114 is further tightened. At the same time the panel clamp 103 lowers, until the clamping arm 104 is sufficiently engaged with the edge of the solar panel 110. When the fastener 114 is sufficiently tightened, the panel clamp assembly 100 is attached to the rail 10 and clamping the solar panel(s) 110 to the rail 10, as shown in FIG. 12.

The panel clamp assembly can further comprise an optional compression limiter rib 150, shown in FIGS. 13B and 13C. The compression limiter rib 150 stops the travel of the fastener 114 when it is sufficiently tightened, as seen in FIG. 13C.

Figure 14A:
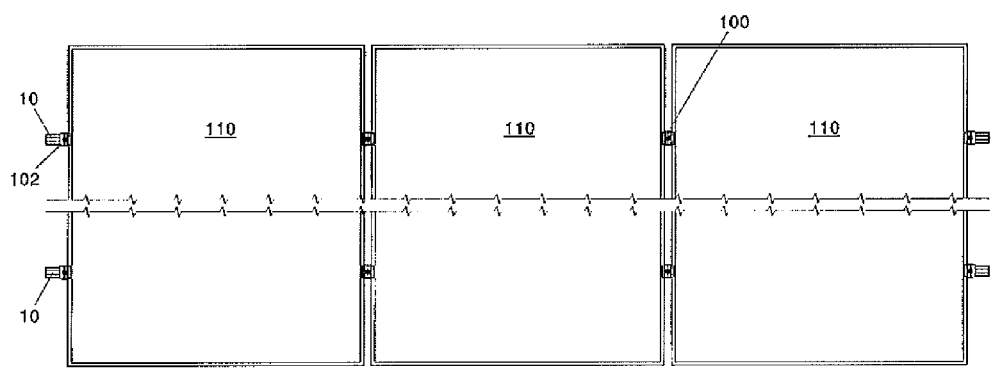
FIG. 14A is a top plan view of a solar panel array using clamp systems disclosed herein.
Figure 14B:
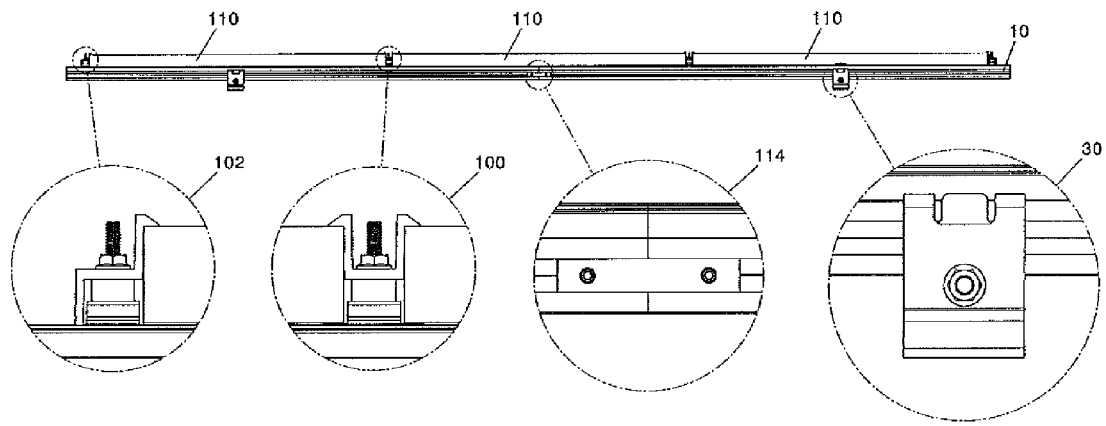
FIG. 14B is a side view of the solar panel array of FIG. 14A with the systems used expanded for show detail.

FIG. 14A is a plan view of a portion of a solar panel array. The portion shown depicts three solar panels 110 attached to two panel rails 10. The solar panel array utilizes the splice kit 14 and clamping assemblies 30, 100 already disclosed. FIG. 14B is a side view of FIG. 14A illustrating an example of the placement of the splice kit 14 and clamping assemblies 30, 100. FIGS. 14A and 14B are provided by means of example and are not meant to be limiting. Because they do not require drilling and can be mounted along any part of the rail, the configurations in which the assemblies can be arranged are seemingly unlimited. The splice kit 14 is only required where two rails 10 are joined.

Figure 15:
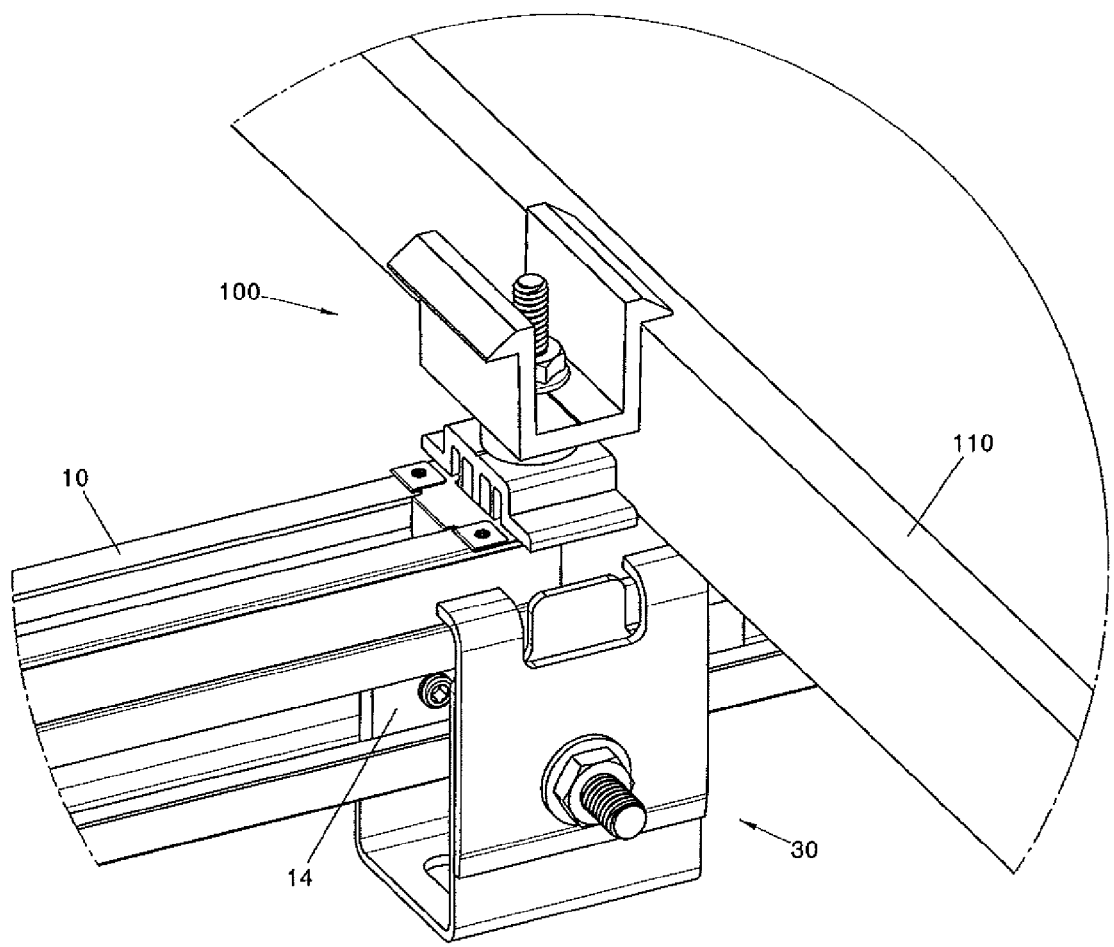
FIG. 15 is a perspective view of a combination of the panel clamp assembly, rail clamp assembly and splice kit in use.
Figure 16:
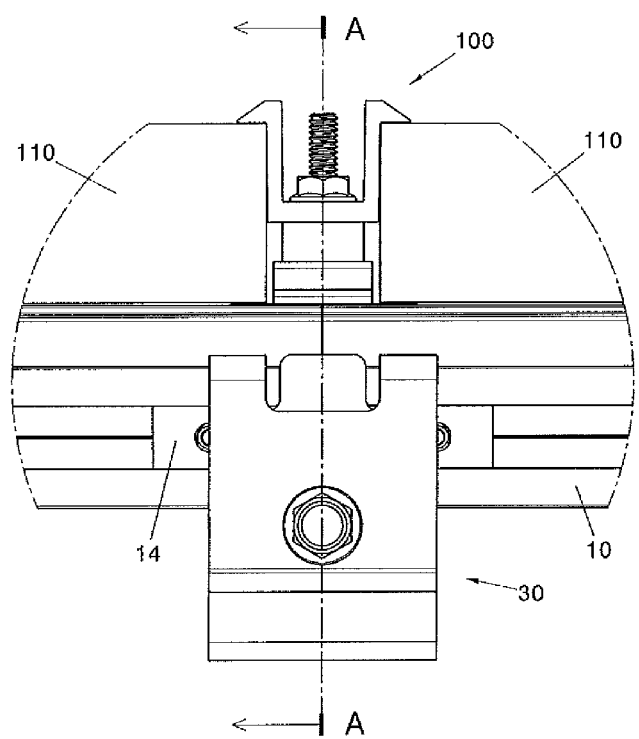
FIG. 16 is a side view of FIG. 15.
Figure 17:
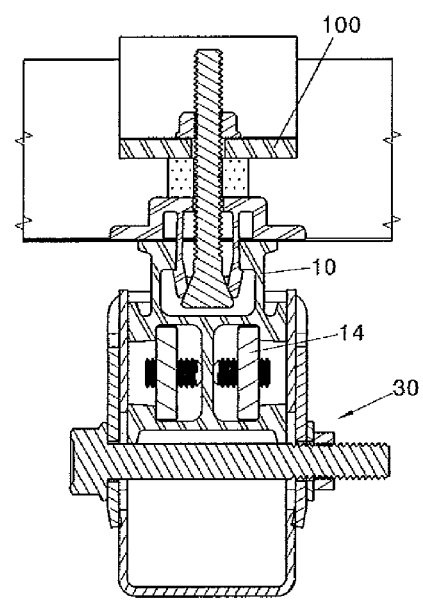
FIG. 17 is a cross section view of FIG. 16 along line A.

FIG. 15 further illustrates the versatility of the clamping assemblies 30, 100. With the three-channel rail 10 shown herein, the rail clamp assembly 30, the panel clamp assembly 100 and the splice kit 14 can all be positioned on the rail 10 at the same place. FIG. 16 is a side view of FIG. 15 and FIG. 17 is a cross sectional view of FIG. 16 along line A. FIG. 17 illustrates how the rail clamp assembly 30 and panel clamp assembly 100 are positioned at the same place along the rail 10 with the splice kit 14.

Figure 18A:
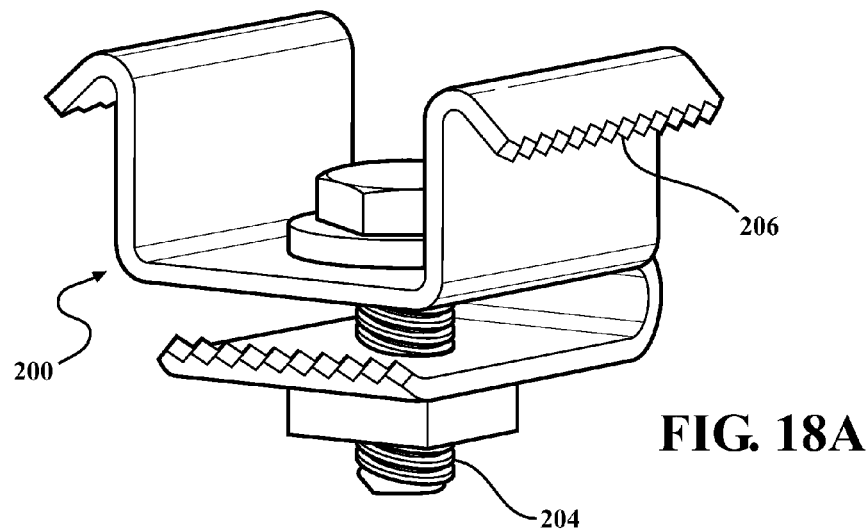
FIGS. 18A and 18B are perspective views of another embodiment of a clamping assembly.
Figure 18B:
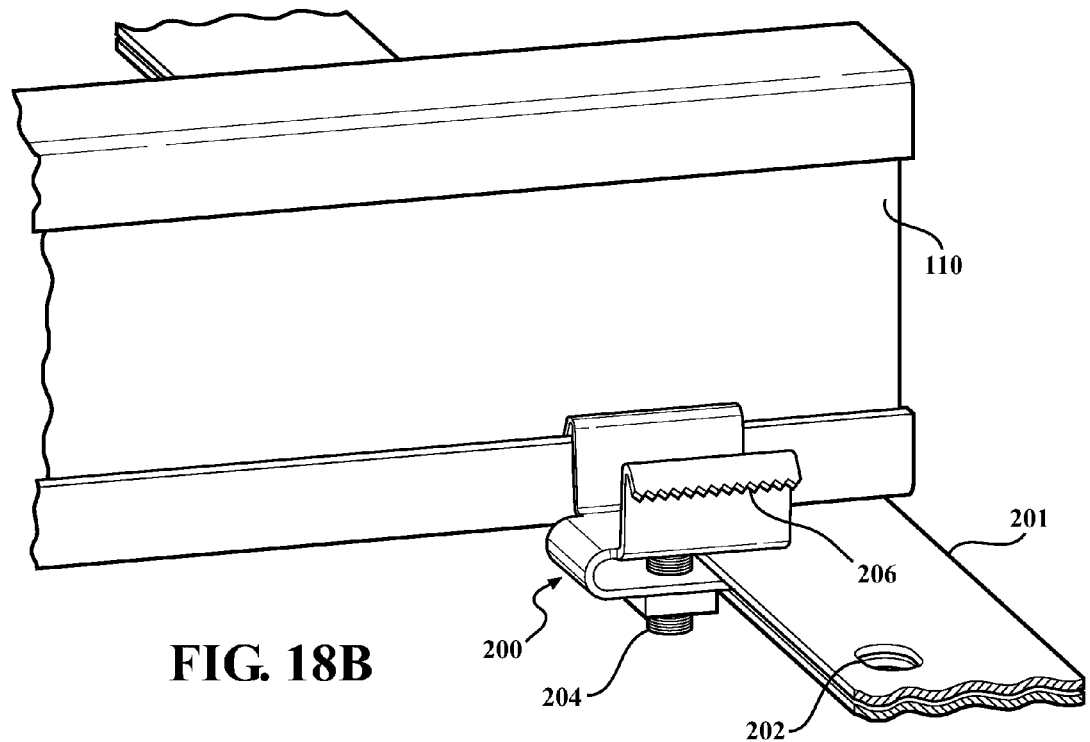

FIGS. 18A and 18B are perspective views of another embodiment of a panel clamping system 200. Solar panel frames 110 are typically C channel 201 frames with holes 202 spaced along the frame to assist in the installation of the panels to mounting systems. However, these holes 202 may not be at a desired or required location. The panel clamping system 200 shown in FIGS. 18A and 18B increases flexibility of clamp positioning and efficiency of installation. This system 200 connects the C channel frames 201 of solar panels 110 to the rail 10 of the mounting systems. The fastener 204 shown used in the system 200 does not penetrate the holes 202 in the C channel frame 201. The fastener 204 is only used to tighten the grip of the clamping system 200 on the frame 201, allowing the panel 110 to be secured at any location along the frame 201 and the panel rail 10. The fastener 204 can be loosened slightly to slide the clamping system 200 either along the panel rail 10 or the frame 201 as desired or required. The panel clamps can be installed from the bottom of the solar panels.

This embodiment of the panel clamping system 200 is shown with serrated teach 206 along all three the edges of the clamp 200. It is contemplated that only the edge that clamps the solar panel 110 may have the teeth 206. When the clamp 200 is tightened by tightening the fastener 204, the serrated teeth 206 on the clamp penetrate through the anodized coating on aluminum C frames 201, eliminating the need for additional grounding clips. The embodiment shown in a center panel clamp as it has a clamp edge on each side for holding two solar panels. However, an end panel clamp is also contemplated, having only one clamp edge with serrated teeth to clamp only one solar panel at the end of an array.

Figure 19A:
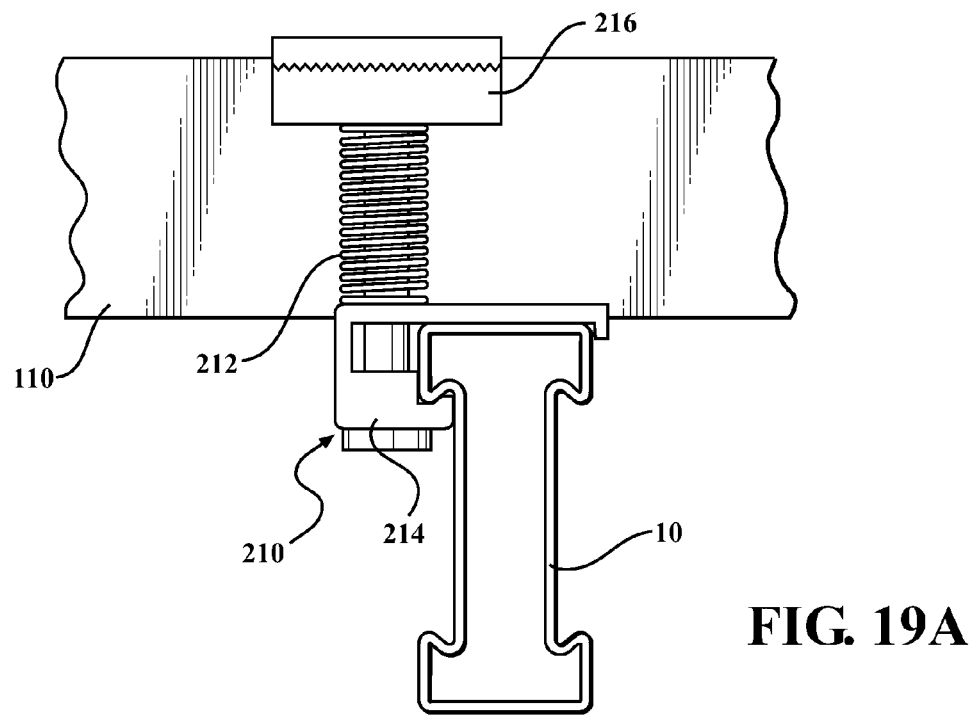
FIGS. 19A and 19B are perspective views of yet another embodiment of a clamping assembly.
Figure 19B:
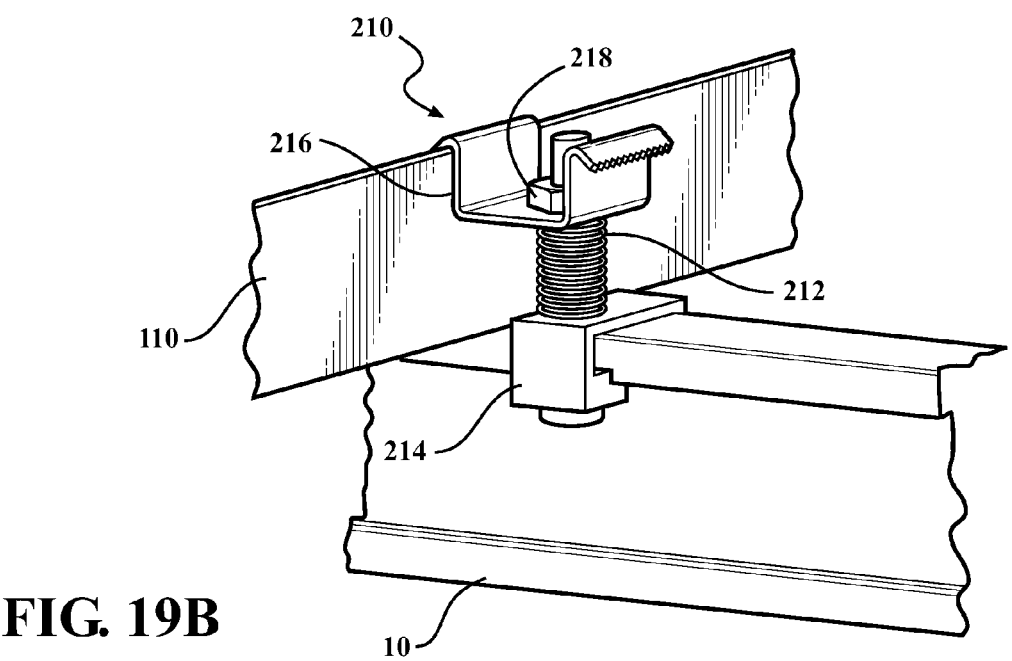

FIGS. 19A and 19B illustrate another embodiment of a panel clamping system 210 to connect solar panels 110 to a panel rail 10. The quick connect panel clamp 210 can be used for top-down panel mounting and eliminates the need to crawl under the panels 110 to secure them after they are in place. The quick connect panel clamp comprises a fastener 212 such as the bolt shown, a panel rail clinch nut 214 through with the fastener 212 is threaded and which is configured to securely grab the panel rail 10 along a portion of one side and the top. The fastener 212 also threads a panel clamp 216, ending in a nut 218 or the like to tighten the panel clamp 216 onto the panel 110 or panel frame.

Figure 23:
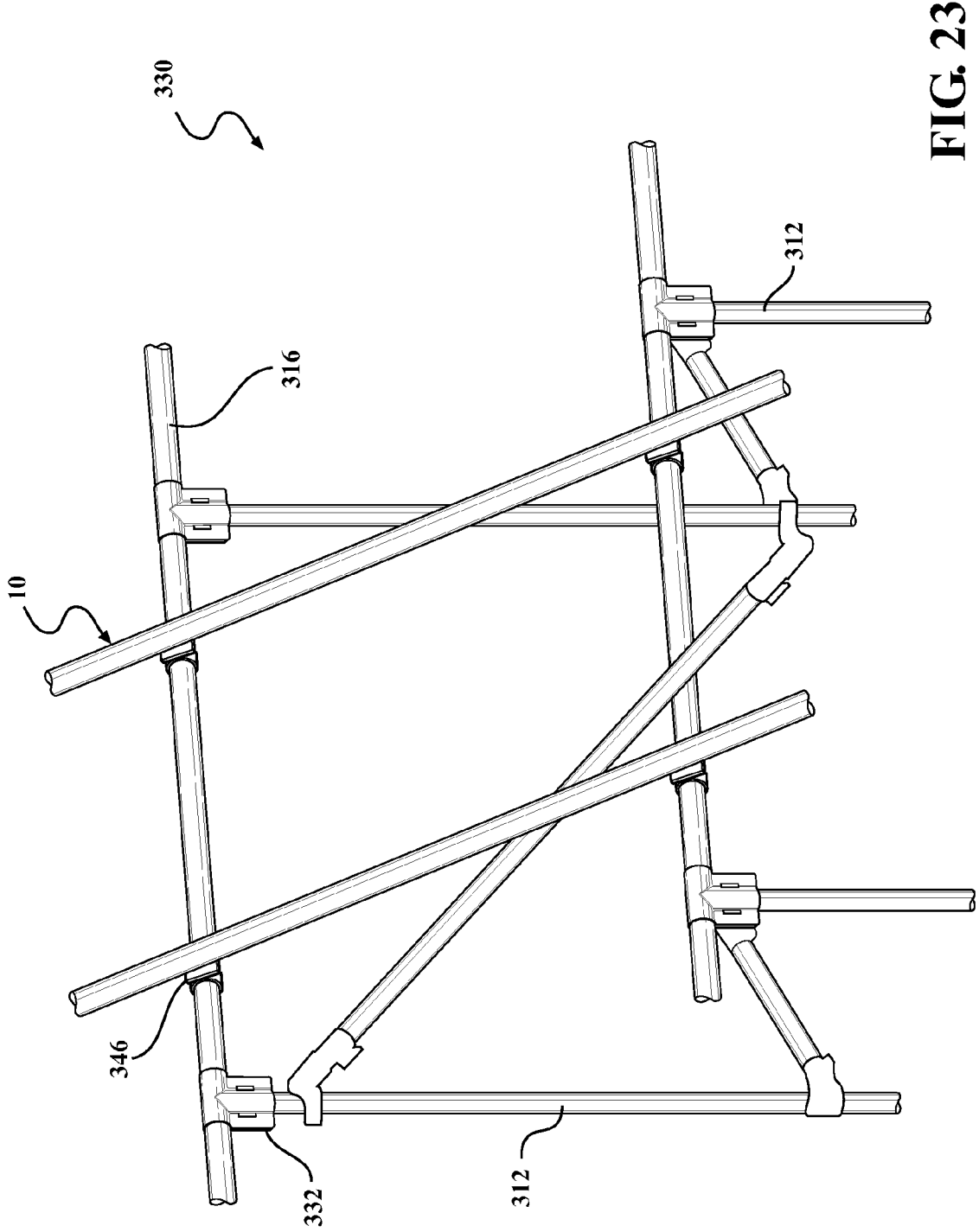
FIG. 23 is partial perspective view of another ground mounted solar panel racking system.

FIG. 20 is an embodiment of a ground array mounting system 310 with a single row of poles 312. The single row design reduces the overall material consumption and requires less digging or mounting to a cement pad. The number of poles 312 can vary as desired or required by the number and size of the solar panels to support. FIG. 23 is an embodiment of a ground array mounting system 330 having poles 312 in a multi-row pattern. The number of poles 312 can vary as desired or required by the number and size of the solar panels to support. The number of rows can also vary. Another embodiment of a ground array mounting system can use a single pole. The embodiment can be either a fixed angle or an adjustable angle system. The size of the horizontal tubes can vary as desired or required by the number and size of the solar panels to support. The poles of any of the embodiments may be sunk into the ground or may utilize a ground mounting attachment. The location of I beams 10, also called panel rails, is shown as an exemplary illustration and can be varied in location and number as desired or required.

The bracketing systems will now be described with reference to the particular embodiments of the mounting systems. However, it is contemplated that the systems may vary in the use of bracketing systems, rails as illustrated or I beams, tubes and poles as desired or required. Furthermore, the bracketing systems described herein can also be used with other systems, including roof mounted systems and to retrofit existing racks for easier and improved installation.

Figure 21:
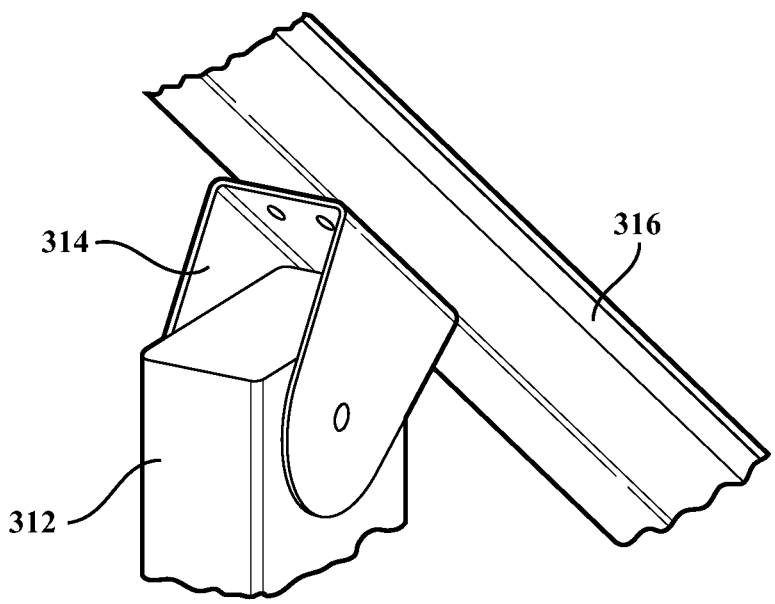
FIG. 21 is perspective views of an embodiment of a mounting bracket disclosed herein.
Figure 22:
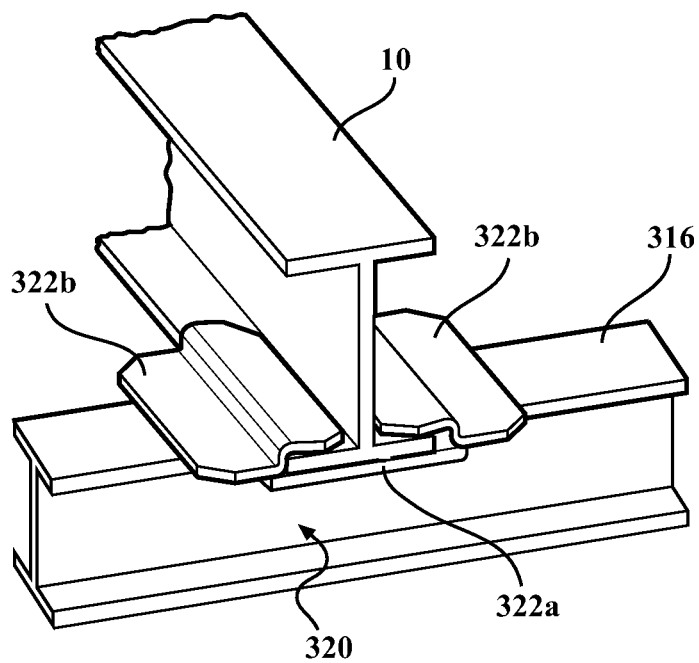
FIG. 22 is a perspective view of another clamp system disclosed herein.

The embodiment of the mounting system of FIG. 20 is illustrated utilizing multi-angle U brackets 314 shown in FIG. 21 to connect the support poles 312 with their respective base beams 316 at any angle desired or required to optimize the efficiency of the solar panels. Panel rails 10 are connected substantially perpendicular to the base beams 316 as shown in FIG. 20 using a no-drill connection system 320 shown in FIG. 22. Four panel clamps 322a, 322b can be configured in such a way as shown in FIG. 22 so that the base beam 316 and panel rails 10 can be connected without the need for drilling. This reduces the need for nuts and bolts, saves time during installation, and requires fewer tools. The panel clamp 322a, 322b shown is exemplary and can be of different shapes and sizes as long as the step configuration is sized as required to securely hold the base beam 316. The bottom two clamps 322a are attached perpendicular to the top two clamps 322b with any means suitable, such as welding, pressing, or bolting. The base beam and panel rails can be slid into the no-drill connection system as shown in FIG. 22.

Figure 24:
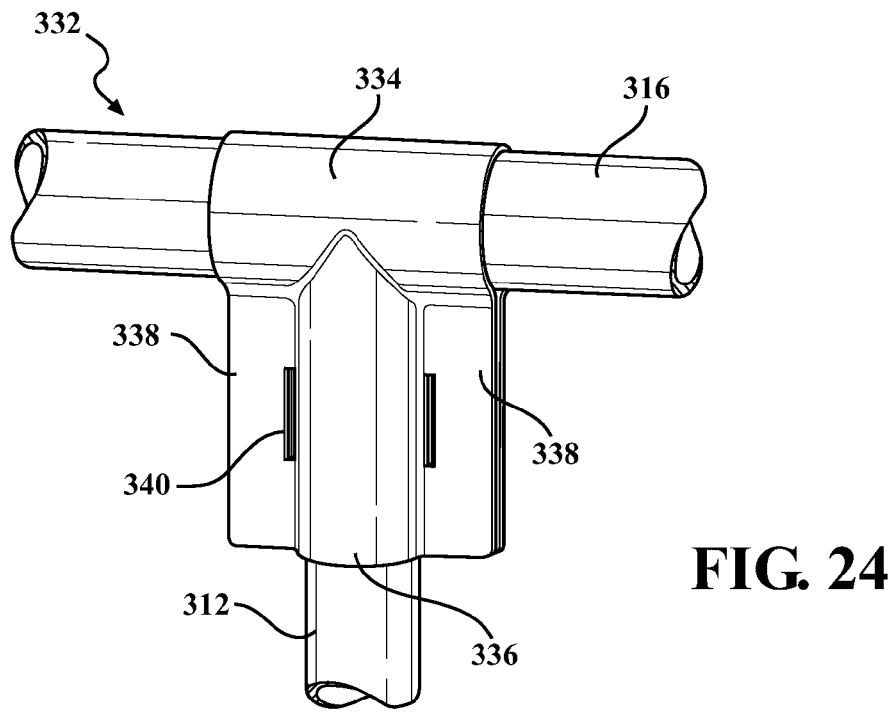
FIGS. 24 and 25 are perspective views of an embodiment of a cross brace as disclosed herein.
Figure 25:
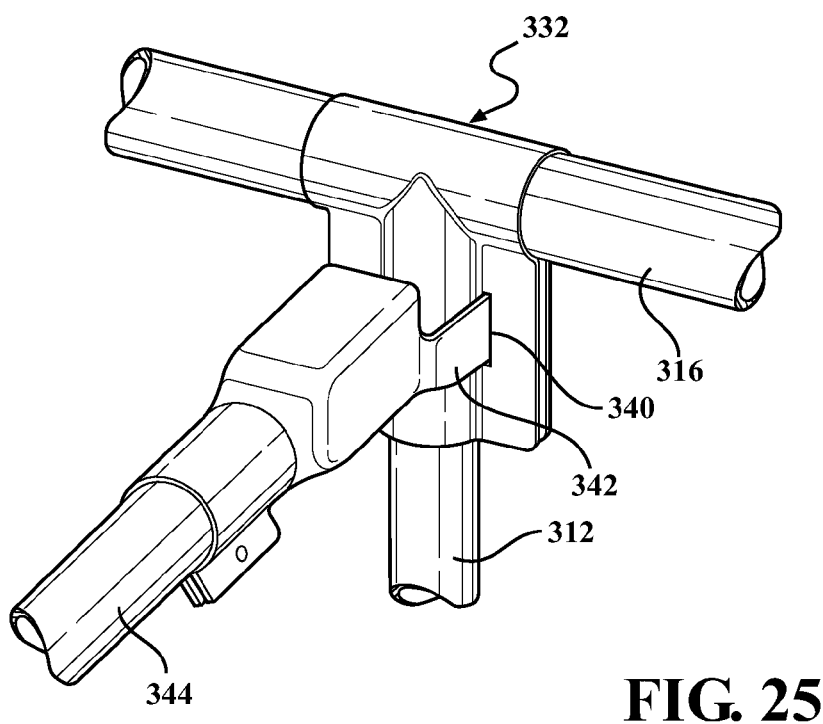

The embodiment of the mounting system 330 of FIG. 23 is illustrated utilizing tubes as the support poles 312 and base beams 316. However, it should be noted that either tubes or I beams or other structures can be used to form the system, changing the required bracket connections required. When connecting vertical poles 312 to horizontal poles as base beams, an integrated cross brace 332 shown in FIG. 25 is used. This embodiment is a no-drill configuration, again easing installation the mounting system with which it is used. The integrated cross brace 332 shown in FIG. 24 has a horizontal tube 334 sized just larger than the size of the base beam 316 tube, a vertical tube 336 sized just larger than the size of the support pole 312, wings 338 formed at the closures of each of the tubes 334, 336, and two slots 340 in the wings 338 on either side of the vertical tube 336 to receive a brace 342 for a cross beam 344. The brace 342 can be of any material suitable in strength to support the mounting system.

Figure 26A:
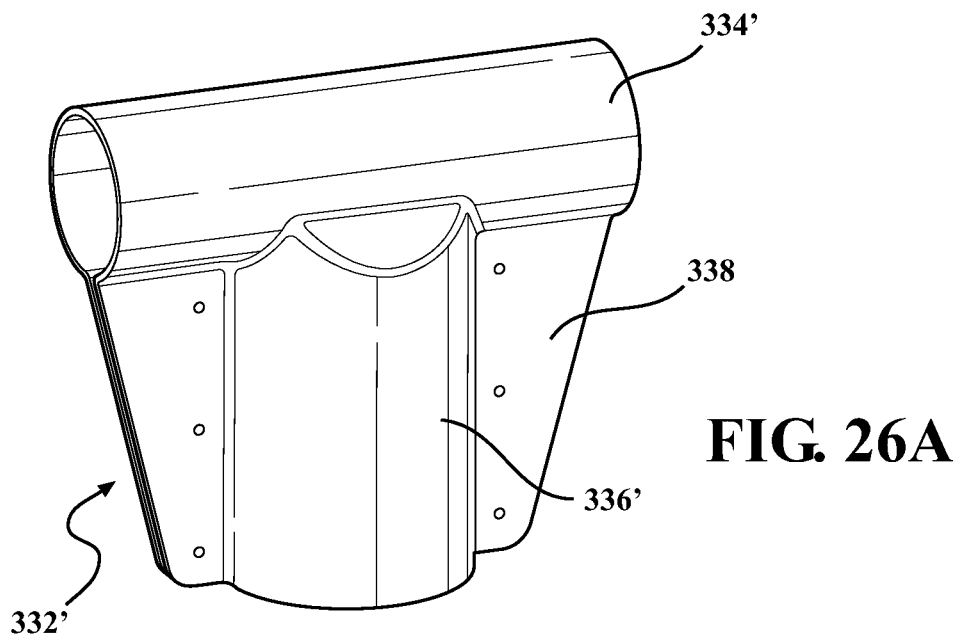
FIGS. 26A and 26B are perspective views of another embodiment of a cross brace as disclosed herein.
Figure 26B:
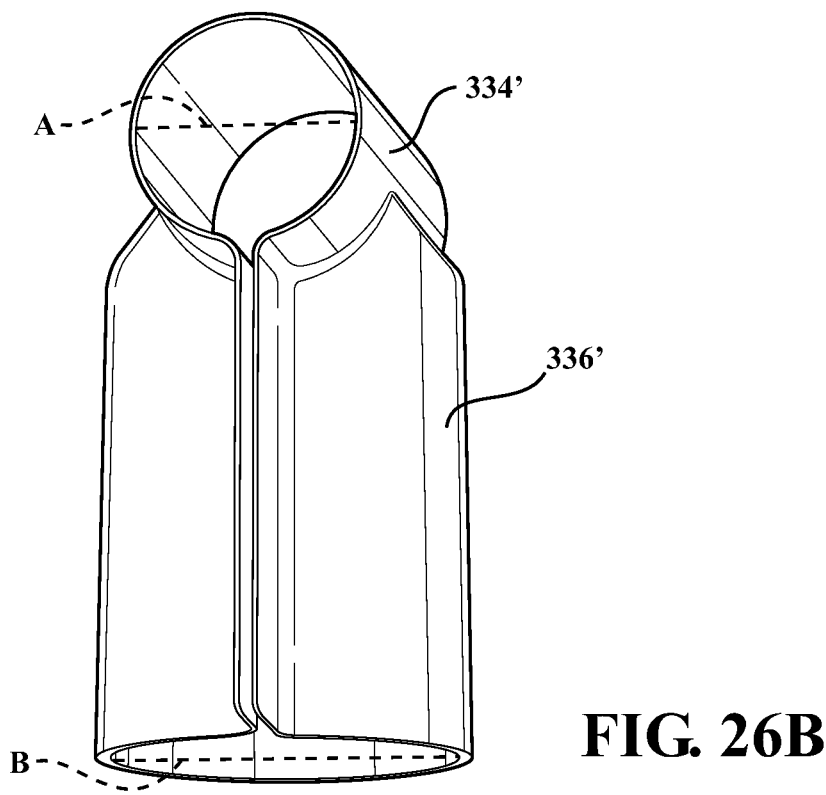

FIGS. 26A and 26B illustrate another embodiment of the integrated cross brace 332'. This embodiment is for use with tubes that are of different diameters. This integrated cross brace 332' again is a no-drill configuration, easing installation of the mounting system with which it is used. The integrated cross brace 332' has a horizontal tube 334' having a different diameter A than the diameter B of the vertical tube 336'. Wings 338 are formed at the closures of each of the tubes 334', 336'. This embodiment is not shown with two slots 340 in the wings 338 on either side of the vertical tube 336' to receive the brace of the cross beam. However, either embodiment can include or not include the slots 340 as desired or required. The slots 340 can be of any shape suitable for the brace that will be used.

Figure 27A:
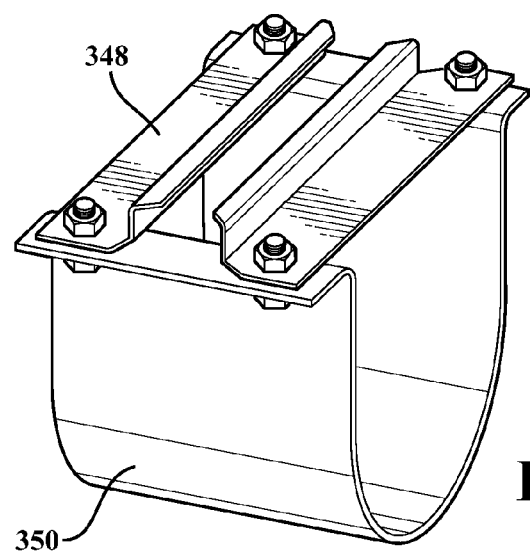
FIG. 27A is a perspective view of a system connector as disclosed herein.
Figure 27B:
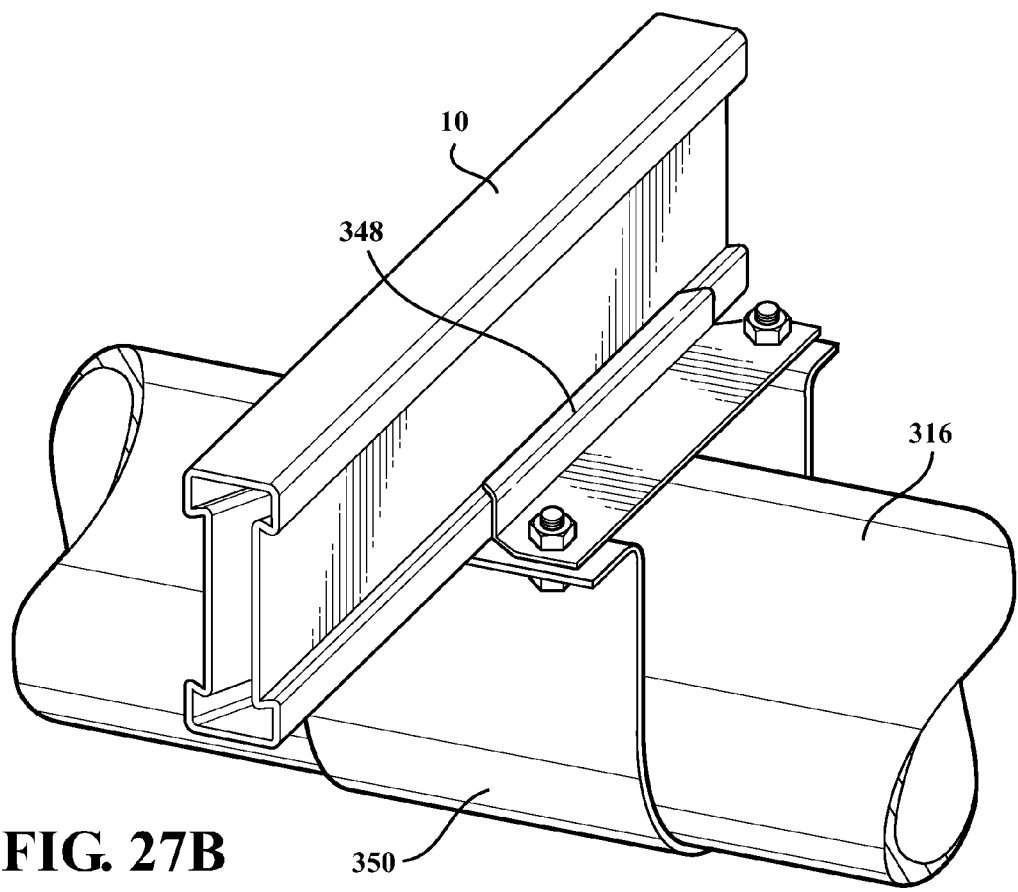
FIG. 27B is a perspective view of the system connector of FIG. 27A in use.

Also used in the mounting system 330 shown in FIG. 23 is a no drill tube/I-beam connector 346. The tube/I-beam connector 346 is shown in detail in FIGS. 27A and 27B. Two Z brackets 348 are attached to a U bracket 350 as shown in the figures. The base beam 316 tube and the panel rail 10 I-beam are simply slid into place and held securely with the no-drill connector 346. This connection also allows the solar panel angle to be adjusted as desired or required to maximize efficiency.

Figure 28A:
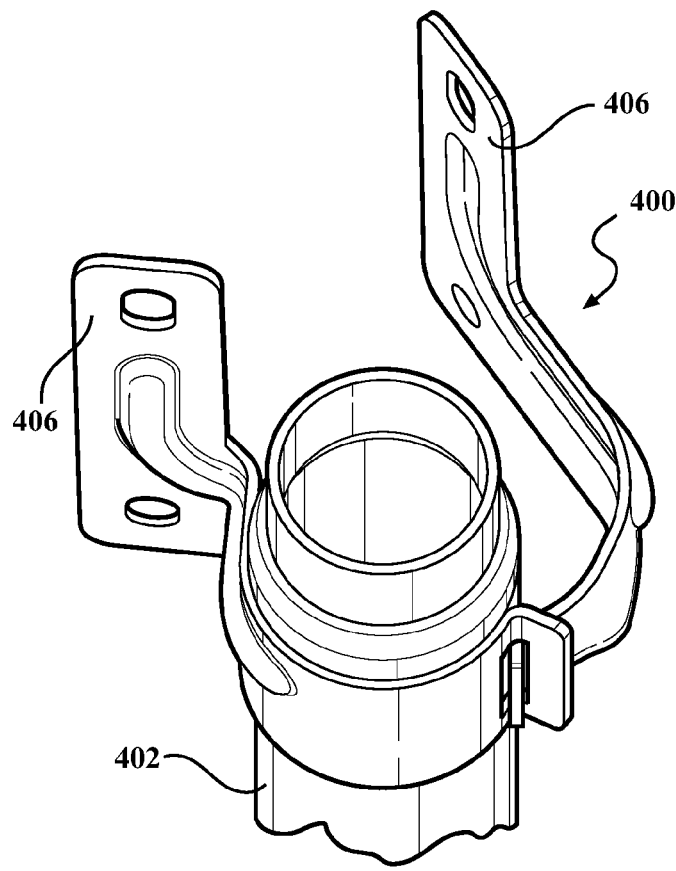
FIG. 28A is a perspective view of a clamp bracket as disclosed herein.
Figure 28B:
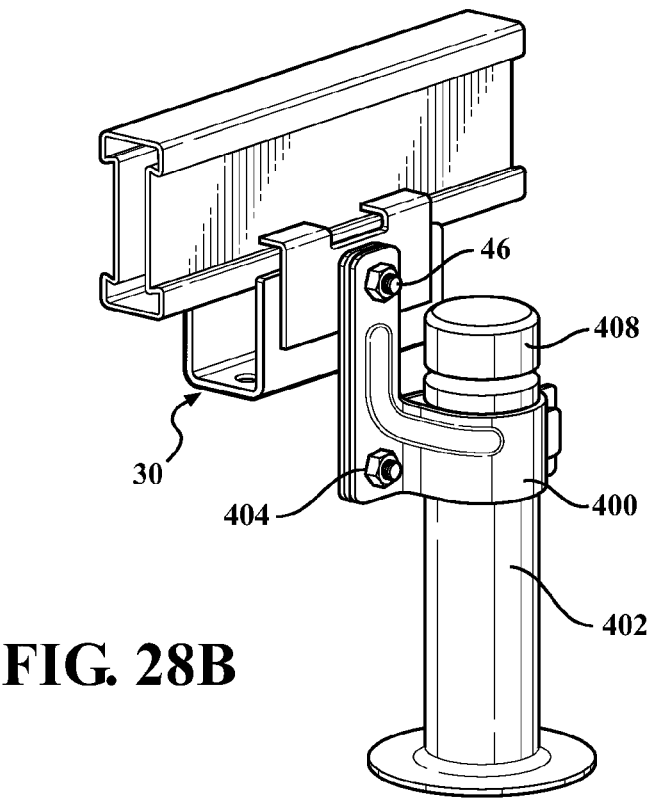
FIG. 28B is a perspective view of the clamp bracket of FIG. 28A in use with the rail clamp assembly shown in FIG. 4.

FIGS. 28A and 28B illustrate the use of the rail clamp assembly 30 with a clamp bracket 400 to secure a panel rail 10 directly to a stand-off base 402. The clamp bracket 400 shown in FIG. 28A secures tightly to the stand-off base 402 as shown using at least one fastener 404 to join each end 406 of the clamp bracket 400 sufficiently tight to maintain the clamp bracket 400 in a stationary position on the stand-off base 402 when the weight of the rails and panels is supported. The clamp bracket 400 can be adjusted to any height along the base 402. When the claim bracket 400 is in place, the rail clamp assembly 30 can be attached to the clamp bracket 400 with fastener 46, as shown in FIG. 28B. The stand-of base is shown with a press fit cap 408 for water management. This configuration is shown with a stand-off base but its use is not limited to such and can be used with any other configuration desired.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A panel clamp assembly configured to clamp a solar panel to a rail system, the panel clamp assembly comprising:
a panel clamp having a base and at least one arm extending from an edge of the base, the arm having a clamping end opposite the base, the base having an aperture therein;
a rail clamp having a central portion with an aperture therein and two flexible tabs extending from the central portion on opposing sides of the aperture; and
a fastener threaded through the apertures in the central portion and the base such that that flexible tabs contact a head of the fastener and the at least one arm extends in an opposite direction from the flexible tabs.

2. The panel clamp assembly of claim 1, wherein the panel clamp has two arms extending from opposing edges of the base, the arms configured to each clamp an edge of adjacent solar panels.

3. The panel clamp assembly of claim 1, further comprising a deformable portion positioned between and in contact with the panel clamp and the rail clamp.

4. The panel clamp assembly of claim 3, wherein the deformable portion is a foam material.

5. The panel clamp assembly of claim 1, wherein the central portion of the rail clamp has two step portions each at an opposing edge of the central portion, wherein a step of the step portion extends in a same direction as the flexible tabs.

6. The panel clamp assembly of claim 5, wherein the flexible tabs have a ledge facing away from the fastener, and wherein the flexible tabs extend beyond the step such that the ledge is a predetermined distance from the step portion located on a same side of the aperture.

7. The panel clamp assembly of claim 1, wherein the flexible tabs have a ledge facing away from the fastener, and wherein the flexible tabs extend from the central portion such that the ledge is a predetermined distance from a portion of the central portion located on a same side of the aperture.

8. The panel clamp assembly of claim 1, wherein the fastener is a nut and a bolt.

9. The panel clamp assembly of claim 1, wherein a head of the fastener and the flexible tabs are configured to be received in a channel within the rail and wherein the arm and clamping end of the panel clamp are configured to secure a solar panel to the rail.

* * * * *